United States Patent [19]

Potter

[11] 3,940,230

[45] Feb. 24, 1976

[54] APPARATUS FOR MOLDING A PARTICLE BOARD

[75] Inventor: Edward Potter, Beaverton, Oreg.

[73] Assignees: Edward Potter, Beaverton; Dant & Russell, Inc., Portland, both of Oreg. ; part interest to each

[22] Filed: Apr. 9, 1975

[21] Appl. No.: 566,296

Related U.S. Application Data

[62] Division of Ser. No. 359,687, May 14, 1973, which is a division of Ser. No. 297,999, Oct. 16, 1972, Pat. No. 3,804,935.

[52] U.S. Cl. ............. 425/451.9; 425/410; 425/412; 425/423; 425/812

[51] Int. Cl.² ............................................ B29J 5/08

[58] Field of Search ........ 425/410, 412, 423, 451.9, 425/812

[56] References Cited

UNITED STATES PATENTS

| | | | |
|---|---|---|---|
| 1,130,635 | 3/1915 | Roushar | 425/410 |
| 1,168,168 | 1/1916 | Cosseboom | 425/412 |
| 1,516,126 | 12/1925 | Ross | 425/412 X |
| 2,103,951 | 12/1937 | Lewis | 425/412 X |
| 3,008,235 | 11/1961 | Royer et al. | 425/812 X |
| 3,163,687 | 12/1964 | Einhorn | 425/812 X |
| 3,166,617 | 1/1965 | Munk | 425/410 X |
| 3,756,756 | 9/1973 | Wilson et al. | 425/812 X |

FOREIGN PATENTS OR APPLICATIONS

| | | |
|---|---|---|
| 128,169 | 7/1948 | Australia |
| 84,714 | 2/1965 | France |
| 1,207,054 | 8/1959 | France |
| 1,205,695 | 11/1965 | Germany |

*Primary Examiner*—J. Howard Flint, Jr.
*Attorney, Agent, or Firm*—Chernoff & Vilhauer

[57] ABSTRACT

An apparatus for molding a particle board product manufactured from the wood waste of sawmills, such waste preferably comprising cedar or redwood bark, sawdust and shavings. The product may also be made from certain non-wood fibrous vegetable materials, such as bagasse. The particle board is prepared by mixing dried sawmill waste or other fibrous material of substantially uniform particle size with phenolic resin and wax in predetermined proportions, and placing a measured amount of the resultant mixture in an elongate mold where it is bonded together under the influence of heat and pressure. The mold includes a moveable pressure plate forming the top of an enclosure within which the material is compressed to a predetermined thickness by pressure applied to the exterior of the plate. The thickness of the cmpressed mixture is substantial, so as to enable continuous solid pieces of the processed material later to be cut to standard dimension lumber sizes. After the material in the mold has been compressed to the predetermined thickness, fasteners are attached for retaining the pressure plate in its compressed position. Thereafter the mold is taken from the press and transferred to an oven where its contents, still under pressure from the retained pressure plate, are baked and cured for an extended period of time and then allowed to cool. The resultant thick bonded material has sufficient strength and other characteristics to make it suitable for use as a substitute for lumber studs and certain other types of dimension lumber.

13 Claims, 4 Drawing Figures

APPARATUS FOR MOLDING A PARTICLE BOARD

This application is a division of co-pending application Ser. No. 359,687, filed May 14, 1973, which is a division of application Ser. No. 297,999, filed Oct. 16, 1972 and subsequently issued as U.S. Pat. No. 3,804,935.

BACKGROUND OF THE INVENTION

This invention relates to a apparatus for molding a bonded product, made of sawmill wood waste or other suitable fibrous waste matter, having sufficient continuous thickness, strength and other characteristics to enable the product to be utilized satisfactorily as a lumber substitute. The invention enables the product to be manufactured at a high production rate despite its substantial continuous thickness, without inordinate financial investment in equipment.

The lumber industry is presently confronted with the severe problem of disposing of vast amounts of bark and other wood waste accumulating at sawmills in the lumber-producing regions of the United States. Although limited amounts of the waste may be used in paper production or as fuel, there remain huge quantities of bark, sawdust and shavings for which no adequate market presently exists. In the past, disposal of the material by burning caused sufficient air pollution that the practice has now been almost completely prohibited. More recent types of disposal result in land pollution or land disfiguration, which is equally undesirable. Industries producing other types of fibrous vegetable waste, such as bagasse from sugar cane processing, are faced with a similar disposal problem.

In recent years the wood products industry has introduced an assortment of resin-bonded particle board products to the market in an attempt to develop a demand for sawmill wastes. Several of these products, and the processes by which they are made, are exemplified in Roman U.S. Pat. No. 2,446,304, Goss U.S. Pat. No. 2,581,652, Elmendorf et al, U.S. Pat. No 2,381,269, and Schueler U.S. Pat. No. 3,309,444. A significant and almost universal characteristic of the various particle board products is that they are prepared by compressing and curing them over an extended period of time in a relatively expensive hot platen press. This occupies the press and thus delays production for the period of time necessary to insure sufficient curing of the resin binder the length of curing time being a function primarily of the thickness of the compressed material. (The temperature of the press cannot be raised significantly to shorten the curing time because charring or scorching of the material might then result.) The above-mentioned Goss patent has suggested that the delay problem might be alleviated by removing the pad of compressed material from the press without curing it and then transfering it to a separate oven. This proposal is unacceptable, however, because relieving the external pressure prior to curing will yield an inadequately bonded product. Consequently, to avoid tying up expensive platen presses for an inordinate period of time and thereby delaying production unduly while waiting for the material to cure, particle board manufacturers have generally limited the maximum final thickness of the product to between ½ and ¾ inch. Such limited thickness requires only a fraction of an hour for curing in a platen press under normal temperature conditions as opposed, for example, to at least two hours for material of 1½ inch thickness.

Unfortunately the practical limitations on the maximum thickness of particle board, imposed by the shortcomings of present production methods, has severely limited the market for which particle board is suitable. The product is satisfactory for use as a decorative or protective siding, but lacks the continuous solid thickness necessary to permit its being cut to standard dimension lumber sizes, for example the 1½ inch thickness now required of a nominal 2 × 4 stud. This limitation has, up to now, effectively foreclosed particle board from entry into the very substantial market for framing lumber, i.e. the dimension lumber market, wherein the demand for the product might well multiply many times and thereby offer some solution to the present sawmill waste problem.

An additional drawback of present particle board for this application is that it is generally denser than lumber, tending to require relatively greater shipping costs which would place particle board at a competitive disadvantage in the dimension lumber market. Moreover there has apparently been a failure in the industry to discriminate between those types of bark which may be used in particle board without adversely affecting its strength, and those types which detract from its strength. This has generally resulted in a reluctance to use any kind of bark in a particle board product where strength is a factor. These problems have tended further to limit the effectiveness of particle board as an answer to the overall wood waste disposal problem.

Accordingly a great need presently exists for a particle board product which utilizes a maximum amount of vegetable waste matter in its manufacture and has thickness and other characteristics sufficient to enable such product to be sold competetively in the dimension lumber market as a lumber substitute, particularly for use as studding, thereby establishing a requirement for a much greater percentage of sawmill and other fibrous vegetable waste matter than is presently being utilized. In order to accomplish this purpose a new apparatus is required by which much thicker continuous layers of the particle board material may be cured under pressure than has been accomplished in the past, such apparatus being capable of a high production rate despite the need for long curing times and yet not requiring an unusually high investment in equipment to achieve such production rate.

SUMMARY OF THE PRESENT INVENTION

The present invention is directed to a unique apparatus for molding a particle board product which satisfies the foregoing ecological and industrial requirements. The product may be manufactured from the total waste, including bark, sawdust and shavings, of cedar or redwood sawmills, leaving no component of the waste to be otherwise disposed of. Other types of sawmill wood waste, i.e. sawdust, shavings and chips from fir, pine, hemlock etc., may also be utilized in the product, but the use of bark from other than cedar or redwood cannot be recommended because it lacks the fibrous consistency necessary for a strong finished product. Alternatively, other vegetable fiber waste such as bagasse may be used in the manufacture of the product. The particle board product comprises molded solid pieces of sufficient continuous thickness (at least 1½ inches) to enable it to be cut to standard dimension lumber sizes, such as the nominal 2 × 4 size. In addition the product has a density and compressive strength comparable to that of lumber, with sufficient tensile strength, nail retention and other characteristics to render it suitable for the high-volume stud market and for selected other uses.

The unique apparatus with which the product is prepared is designed to alleviate the production delay problem which would otherwise be encountered in attempting to heat and cure such thick pieces of material while simultaneously maintaining pressure on the material. The problem of occupying an expensive platen press for the several hours required to cure material of such substantial thickness is overcome by separating the function of initially compressing the material from the functions of retaining pressure on the material and heating the material. This eliminates the need for platen presses altogether and enables the product, after initial compression in a conventional press, to be removed from the press without thereby decompressing the material due to the provision of the separate pressure retention function. The pressurized material may then be transferred to a separate oven of large capacity wherein the lengthy curing process may take place. This frees the press, by far the most expensive single piece of equipment utilized in the process, to compress additional quantities of the material which may then immediately be added to the oven while the initial material is being cured.

The unique separation of the initial compression, pressure retention and heating functions is accomplished by utilizing a plurality of special molds for holding the waste material, adhesive binders and other mixed ingredients from which the product is manufactured. Each mold includes a moveable pressure plate which, in combination with the mold, forms an enclosure surrounding the material. By placing the mold in a press and applying pressure to the plate, the material may thereby be initially compressed to the desired thickness and to a shape conforming with the interior of the mold. While the mold is under initial compression, fastener means are applied to the mold which function to retain the pressure plate in its compressed position regardless of whether or not the mold thereafter remains in the press. Consequently, it is possible to transfer the mold immediately from the press to a separate baking oven with no expansion or loss of internal pressure of the material, although the initial external pressure imposed by the press has been relieved. The material may then be cured for the required period of time, during which the internal pressure of the material gradually decreases due to the setting of the binder and loss of moisture from the material. After curing has been completed, the material is allowed to cool and is then removed by dismantling the mold. The molds are built in an elongate shape of such predetermined dimension that the final molded material piece may thereafter be sawed conveniently into pieces of standard lumber sizes.

The foregoing and other objectives, features, and advantages of the present invention will be more readily understood upon consideration of the following detailed description of the invention taken in conjunction with the accompanying drawings.

DESCRIPTION OF THE PREFERRED EMBODIMENT

Figure 1:
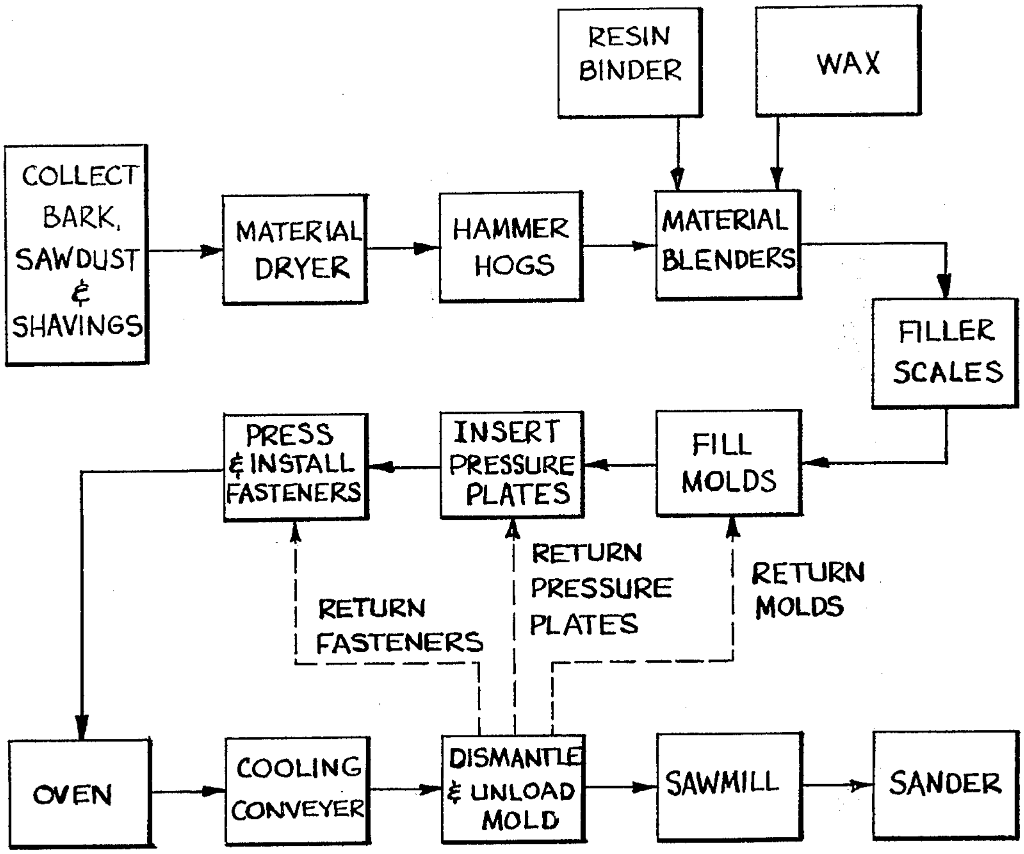
FIG. 1 is a schematic flow diagram of the process with which the molding apparatus of the present invention is utilized to manufacture a particle board product.

FIG. 1 illustrates the various steps in the manufacture of a particle board product from sawmill wood waste utilizing the molding apparatus of the present invention. In the specific example to be discussed, the wood waste is collected preferably from cedar or redwood sawmills as this will enable all of the components of the waste, i.e. the bark as well as the sawdust and shavings, to be utilized indiscriminately in the same proportions as found in sawmill waste. Although chips may also be used in the manufacture of the product, if desired, there will normally be no need to use them since they have an adequate market in the paper manufacturing industry.

It has been discovered that cedar and redwood bark, which represent roughly 30–35% of the total quantity of bark, sawdust and shavings found at cedar and redwood sawmills, are sufficiently fibrous in their makeup so as not to detract significantly from the strength of a particle board product manufactured in accordance with the process described herein, even though the same substantial proportion of bark as actually exists in the total waste material is used in the product. The significance of this discovery is that, at least with respect to cedar and redwood wastes, the product manufactured utilizing the present invention will have a maximum impact on present disposal problems. Unfortunately the bark of other species such as fir, pine, hemlock, and spruce are insufficiently fibrous to support the strength requirements of a particle board product intended for the dimension lumber market. However the sawdust, shavings and chips of such other species may be utilized to good advantage in the product, leaving only a relatively small volume of bark to be otherwise disposed of. Certain other fibrous vegetable materials, such as bagasse waste resulting from sugar cane processing, are also considered to be acceptable for use in a bonded product of this type, either alone or in combination with other fibrous material.

The aforementioned combination of wood waste components is transported from the sawmill to a manufacturing site and dried by any suitable means to a moisture content of approximately 6%, after which the combination of dried bark, sawdust and shavings is placed in a hammer hog and chopped into smaller particles of uniform consistency suitable for molding. Following this initial preparation, the chopped waste material is blended with predetermined quantities of an adhesive resin binder and wax respectively. A phenolic resin is deemed most suitable for this application, a preferred type being dry Monsanto Resinox Compound 673 or 736. The wax may be any one of the commercially available types presently used in particle board manufacture, for example Hercules Brand Paracol 800N. The blending of the hogged waste material with the resin and wax is preferably done with the aid of batch scales and conventional mechanical mixing apparatus, the resultant mixture comprising approximately 91% wood waste, 7½% dry phenolic resin and 1½% wax by weight.

Figure 2:
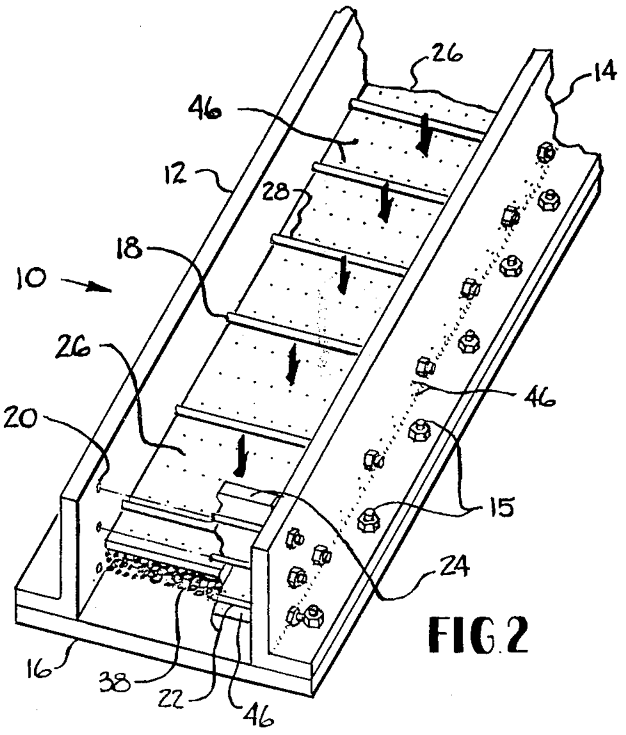
FIG. 2 is a fragmented perspective view of a typical mold which may be utilized in the manufacture of the product, with certain portions cut away for clarity.

The next step comprises placing measured quantities of the resultant mixture in respective molds of the type shown in FIG. 2. A typical mold, designated generally as 10, comprises an elongate, channel-shaped container having a pair of flat, parallel upright side walls 12 and 14 connected at the bottom by means of bolts 15 to a base 16 which is joined at right angles with each of the walls 12 and 14. A group of spaced apertures 18 is formed in each of the side walls 12 and 14 respectively, each group running in a straight line above and parallel to the base member 16 with opposite apertures being in transverse alignment with one another. At each end of the mold 10 a vertical row of transversely aligned apertures 20 is also provided in each of the side members 12 and 14. Through these latter apertures 20 a series of transverse bolts 22 are fastened to support respective end plates 24 which seal each end of the channel member. A pressure plate member 26 is provided having a width and length just slightly less than the inside dimensions between the two end plates 24 and the side walls 12 and 14, respectively. This permits the plate 26 to move freely in a vertical direction between the sides and end plates of the mold, thereby forming a mold enclosure of variable internal height.

The interior length of the mold enclosure is preferably slightly more than 24 feet to enable the molding of pieces which may thereafter be sawed in thirds to produce dimension lumber in eight foot lengths (the normal length of a stud). The interior width between the side members 12 and 14 is preferably 11½ plus inches as this will permit the resultant molded pieces to be produced alternatively in standard nominal sizes of 12, 6 or 4 inch widths after allowing for cutting and sanding. It is expected that nominal 4 inch width pieces (which have an actual width normally of 3 9/16 inches) will be by far the highest volume items, and the molds should accordingly have an interior width which is approximately a multiple of this dimension. Some molds having an interior width of 10 plus inches might also be provided, to enable production of nominal 5 or 10 inch width pieces.

Most types of dimension lumber, and 2 × 4 studs in particular, require a minimum actual thickness of 1½ inches. Consequently the interior height of the ultimate mold enclosure, i.e. the interior area bounded by the channel member the end plates 24 and the underside of the pressure plate 26, must be at least equal to or greater than this dimension to form molded pieces of adequate continuous thickness. This thickness is regulated by the ultimate vertical position of the pressure plate 26, which is in turn determined by the locations of the two rows of apertures 18. Accordingly, with the thickness of the plate 26 taken into account, the two rows of apertures 18 must be spaced a sufficient distance above the upper surface of the base 16 that, when fastener bolts 28 are inserted transversely through the aligned apertures 18 and the pressure plate 26 is installed as shown in FIG. 2 with its upper surface abutting the underside of the bolts 28, the interior space between the plate 26 and the base member 16 will be equal to the thickness desired for the pressed product.

Figure 3:
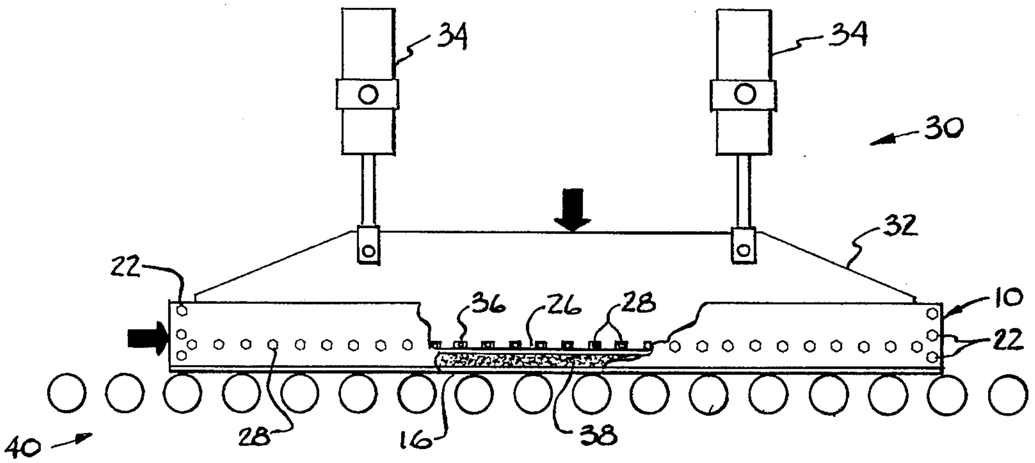
FIG. 3 is a simplified, partially schematic side view illustrating the initial compression of the particle board material in a press, with portions of the mold cut away for clarity.

In the use of the molding apparatus of the present invention, the foregoing blended mixture of waste material, resin and wax is weighed into separate measured quantities preparatory to being placed in a respective mold 10 of the type just described. For a mold having interior dimensions approximately 24 feet long and 11½ inches wide, and having an ultimate interior enclosure 1½ inches high, about 135 pounds of the mixture must initially be placed in the mold. In its uncompressed condition the mixture can be expected to fill the mold to a height of approximately 8 inches when spread evenly. As soon as the mold 10 has been filled with the measured weight of mixture, the pressure plate 26 is inserted into the mold atop the mixture and the mold is conveyed to a press. The press, indicated generally as 30 in FIG. 3, comprises an elongate, cylinder-actuated plunger 32 sized so as to fit loosely between the side and end walls of the mold 10 and designed to distribute a predetermined initial external pressure evenly along the top of the pressure plate 26. The bottom face of the plunger 32 includes a group of transverse notches 36 spaced so as to correspond with the spacing of the apertures 18 in the side walls of the mold 10.

Upon placement of the mold in proper position beneath the press 30, with the apertures 18 vertically aligned with the notches 36, pressure is applied to the plunger 32 which thereby forceably pushes the pressure plate 26 into the mold 10 and compresses the mixture 38. An initial external pressure of between about 800 psi and about 1100 psi applied to the pressure plate 26 is required to accomplish compression to the desired thickness and density, it having been found through experimentation that a pressure of about 1000 psi yields optimum results. While the external pressure is being applied, the fastener bolts 28 are inserted through the respective apertures 18 over the plate 26, the insertion being made possible by the aligned notches 36. After insertion the bolts are tightened so as to prevent any spreading of the side walls 12 and 14 of the mold which might otherwise occur due to the internal pressure within the compressed material 38. The press 30 is then released, but the internal pressure existing within the mixture 38 is nevertheless maintained by the plate 26, now held in its compressed position by the fastener bolts 28 as shown in FIG. 2. While the mold is in this condition it is removed from the press 30, preferably by transferring it forward on a conveyor such as 40. This frees the press 30 immediately to accept another mold of the same type, thereby permitting the compression and fastening steps just described to be repeated continuously.

Figure 4:
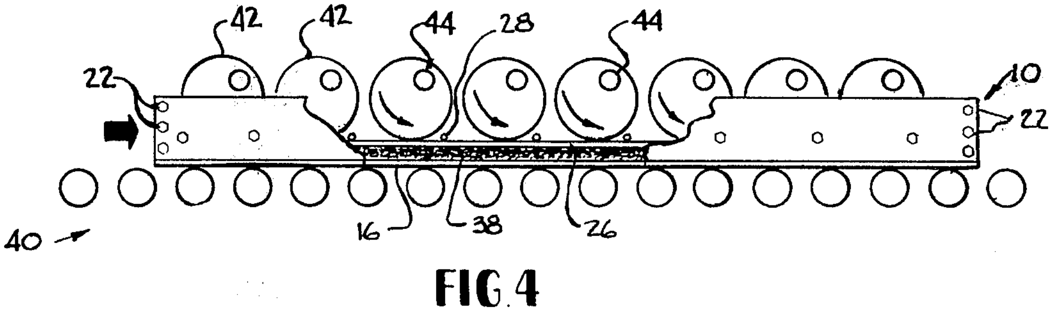
FIG. 4 is a simplified, partially schematic side view illustrating an alternative press for compressing the material.

A somewhat different type of press, also capable of accomplishing the foregoing compression step, is shown in FIG. 4. The mold 10 and compression process are the same as before, but in this case the press comprises a series of eccentrically mounted rollers 42, each fixed to a respective shaft 44. Initially the rollers 42 are situated with their eccentric portions facing upwardly to permit the mold 10 to be placed beneath the rollers. Thereafter the rollers 42, which are narrow enough to fit between the side walls 12 and 14 of the mold, are forceably rotated in a counterclockwise direction as shown in FIG. 4 by torque applied to the respective shafts 44, thereby pushing the plate 26 down and compressing the material 38 as before. The fastener bolts 28 may then be inserted in the spaces between the rollers 42 to retain the pressure plate 26. Other molding methods employing the basic mold structure which makes possible the manufacture of particle board utilizing the steps of initial compression and subsequent pressure retention may also be utilized and may be equally satisfactory.

After their removal from the press 30 the molds 10, with their pressure plates 26 still fastened in compressed position, are transferred to a curing oven. The oven is preferably of elongate configuration with multiple tiers of conveyors moving from an entry port to an exit port of the oven. The maximum temperature of the oven should not exceed approximately 450°F., or the materials 38 may be scorched. A temperature of 425°F. is deemed preferable. The speed of the conveyor through the oven is regulated so as to insure a minimum heating period sufficient to properly cure the resin throughout the entire thickness of the material, a minimum curing time of about two hours being required for a material thickness of 1½ inches. Upon their exit from the oven the molds are permitted to cool in ambient air until the compressed material is at least below 200°F., which normally takes about ½ hour. Thereafter the molds may be dismantled by first loosening the bolts 15 on one side of the mold to relieve the pressure on the fastener bolts 28 and then loosening and extracting the bolts 28. Thereafter the bonded particle board product is removed from the mold for cutting and sanding to desired sizes. The molds, pressure plates and fastener bolts respectively are returned to stations where they may be reused in the process.

It should be noted that the side walls and end walls 12, 14 and 24 respectively of the typical mold 10, as well as the base 16 and the pressure plate 26, are provided with a large number of small vent holes 46 which perform a twofold purpose. First, during the initial compression of the material the vents 46 readily permit the escape of air from the mixture and thereby aid the compaction of the material. Second, during the heating step, the same vents 46 also permit the escape of water vapor. In addition, the mold 10 is preferably constructed of an aluminum alloy which is a good conductor of heat and thereby further aids both the heating and cooling processes.

The product resulting from use of the novel mold apparatus in the above-described process is a unique bonded particle board material, preferably including a substantial proportion of either cedar or redwood bark, having a solid continuous thickness of at least 1½ inches and a width and length enabling it to be sawed into pieces corresponding in size to standard dimension lumber. Tests conducted in accordance with ASTM Standard D1037–72 on various samples of the product manufactured from cedar waste showed the material to have the following properties:

| Sample No. | Density (lb/ft³) | Modulus of Rupture (psi) | Compression Strength (psi) | Nail Pull (lbs.) Top | Nail Pull (lbs.) Edge |
|---|---|---|---|---|---|
| 1 | 37.0 | 990 | 5480 | 85 | 59 |
| 2 | 40.2 | 1120 | 4080 | 103 | 60 |
| 3 | 40.2 | 1080 | 4820 | 122 | 78 |
| 4 | 41.0 | 1270 | 6860 | 102 | 100 |
| 5 | 39.6 | 1250 | 8800 | 135 | 89 |

The compressive strength, nail holding qualities and density are particular characteristics which make the product acceptable for use as a substitute for studding and certain other types of dimension lumber. In addition the material cuts well, does not readily produce slivers and is thought to be more termite proof than lumber because of the resin present in the material. If it is desired, for certain applications, to have a stiffer material than that obtainable by the above process, a stiffener such as wire or fiberglass rods or expanded metal can be molded into the material during the manufacturing process by placing the stiffener material in the mold enclosure together with the blended particle mixture prior to the compression step.

The terms and expressions which have been employed in the foregoing abstract and specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A mold for forming a highly densified particle board product of substantial thickness from a mixture of comminuted lignocellulosic material and binder, comprising:

a. an elongate container having spaced, opposing side walls and a base which define a hollow interior, the top of said container being open;
b. an elongate pressure member wholly insertable within said hollow interior of said container through the top thereof; and
c. lock means for fastening said pressure member to said container in a position wholly within said container so as to retain said pressure member in said wholly inserted position, said lock means being positioned intermediate the ends of said elongate container.

2. The mold of claim 1 wherein said lock means includes means for fastening said pressure member to opposing ones of said side walls intermediate the ends of said elongate container.

3. The mold of claim 1 including means connected to the two longest ones of said side walls at a location above said base and intermediate the ends of said elongate container for resisting the spreading apart of said side walls at said location due to outward force exerted thereon from the interior of said container.

4. The mold of claim 1 including means connecting the two longest opposing side walls of said container together at a location above said base and intermediate the ends of said elongate container for resisting the spreading apart of said side walls due to outward force exerted thereon from the interior of said container.

5. The mold of claim 1 including means connected to the two longest ones of said side walls discontinuously at spaced locations along said side walls and intermediate the ends of said elongate container for resisting the outward spreading of said walls due to outward force exerted thereon from the interior of said container.

6. The mold of claim 5 wherein said base and pressure member each includes spaced vent holes defined therein for permitting the escape of fluid therethrough.

7. A mold for forming a highly densified particle board product of substantial thickness from a mixture of comminuted lignocellulosic material and binder, comprising:

a. an elongate container having spaced, opposing longitudinal side walls and a base defining a hollow interior, the top of said container being open;
b. a pressure member insertable through the top of said container;
c. lock means for fastening said pressure member within said container; and d. support means connected to said longitudinal side walls discontinuously at spaced locations along said side walls intermediate their ends for resisting outward spreading of said walls due to outward force from the interior of said container.

8. The mold of claim 7 wherein said support means is connected to a pair of said opposing side walls at spaced locations above said base.

9. The mold of claim 7 wherein said support means connects a pair of said opposing side walls together at said spaced locations.

10. A mold for forming a highly densified product of substantial thickness from a mixture of comminuted lignocellulosic material and binder, comprising:

a. an elongate container having spaced, opposing longitudinal side walls and a base defining a hollow interior, the top of said container being open;
b. a pressure member insertable through the top of said container;
c. lock means for fastening said pressure member to said container at spaced locations so as to retain said pressure member therein; and
d. means connecting said longitudinal side walls together at a location above said base and intermediate the ends of said walls for resisting outward spreading of said walls due to outward force from the interior of said container.

11. A mold for forming a highly densified particle board product of substantial thickness from a mixture of comminuted lignocellulosic material and binder, comprising:

a. an elongate container having spaced, opposing longitudinal side walls and a base defining a hollow interior, the top of said container being open;
b. a pressure member insertable through the top of said container;
c. means connected to at least some of said longitudinal side walls discontinuously at spaced locations along said side walls intermediate their ends for fastening said pressure member within said container and resisting outward spreading of said walls due to outward force from the interior of said container.

12. An apparatus for compressing a mixture of comminuted lignocellulosic material and binder to a predetermined substantial thickness and density, comprising:

a. a mold comprising a container having side walls and a base defining a hollow interior, the top of said container being open;
b. a pressure member insertable within said container through the top thereof; and
c. a press having plunger means for exerting a force on said pressure member, said plunger means being of a size so as to fit within said container through the top thereof and between said side walls.

13. The apparatus of claim 12 wherein said mold and pressure member are of elongate, mating shape and wherein said plunger means is also of a similar elongate shape for substantially evenly distributing said force along said elongate pressure member.

* * * * *

UNITED STATES PATENT OFFICE

CERTIFICATE OF CORRECTION

Patent No. 3,940,230 Dated February 24, 1976

Inventor(s) Edward Potter

It is certified that error appears in the above-identified patent and that said Letters Patent are hereby corrected as shown below:

| | | |
|---|---|---|
| Abstract | Line 16 | Change "cmpressed" to --compressed--. |
| Col. 1 | Line 10 | After "relates to a" insert --unique--; |
| | Line 40 | After "Elmendorf et al" delete the comma (,). |

Signed and Sealed this

Twenty-fourth Day of August 1976

[SEAL]

*Attest:*

RUTH C. MASON
*Attesting Officer*

C. MARSHALL DANN
*Commissioner of Patents and Trademarks*